(12) United States Patent
Ogawa et al.

(10) Patent No.: US 11,370,203 B2
(45) Date of Patent: Jun. 28, 2022

(54) SOUND-ABSORBING OUTER COVERING MATERIAL AND SOUND-ABSORBING MATERIAL

(71) Applicant: NAGOYA OILCHEMICAL CO., LTD., Tokai (JP)

(72) Inventors: Masanori Ogawa, Tokai (JP); Makoto Fujii, Tokai (JP); Hidenobu Ito, Tokai (JP)

(73) Assignee: NAGOYA OILCHEMICAL CO., LTD., Tokai (JP)

( * ) Notice: Subject to any disclaimer, the term of this patent is extended or adjusted under 35 U.S.C. 154(b) by 435 days.

(21) Appl. No.: 16/611,268

(22) PCT Filed: May 2, 2018

(86) PCT No.: PCT/JP2018/017573
§ 371 (c)(1),
(2) Date: Nov. 6, 2019

(87) PCT Pub. No.: WO2018/212002
PCT Pub. Date: Nov. 22, 2018

(65) Prior Publication Data
US 2020/0055293 A1    Feb. 20, 2020

(30) Foreign Application Priority Data
May 15, 2017   (JP) .............................. JP2017-096755

(51) Int. Cl.
*B32B 27/12* (2006.01)
*B32B 27/20* (2006.01)
*B32B 27/30* (2006.01)

(52) U.S. Cl.
CPC .............. *B32B 27/12* (2013.01); *B32B 27/20* (2013.01); *B32B 27/30* (2013.01); *B32B 2260/021* (2013.01); *B32B 2262/0276* (2013.01)

(58) Field of Classification Search
CPC ......... B32B 27/12; B32B 27/20; B32B 27/30; B32B 2260/021; B32B 2262/0276
(Continued)

(56) References Cited

U.S. PATENT DOCUMENTS 5,196,470 A * 3/1993 Anderson .......... C09D 133/064
524/379
2020/0055293 A1* 2/2020 Ogawa .................... B32B 27/12

FOREIGN PATENT DOCUMENTS

| JP | 7-145569 | 6/1995 |
| JP | H11-133980 | 5/1999 |

(Continued)

OTHER PUBLICATIONS

International Search Report (and English Translation thereof) dated Jul. 24, 2018 in connection with International Application No. PCT/JP2018/017573.

*Primary Examiner* — Betelhem Shewareged
(74) *Attorney, Agent, or Firm* — Paul Teng (57) ABSTRACT

A sound-absorbing membrane and a sound-absorbing material, which can improve sound absorbing performance and can improve releasability, are provided. A sound-absorbing membrane 10 includes a base sheet 11 made of a nonwoven fabric impregnated with a water-soluble polymer, and a resin film 12 made of a thermosetting resin covering one surface of the base sheet 11, in which a thickness of the resin film 12 is 0.01 to 0.2 mm, fillers 13 are dispersed in the resin film 12, and a whole airflow resistance is 0.2 to 5.0 kPa·s/m. A sound-absorbing material 20 includes the sound-absorbing membrane 10, and a sound absorbing base sheet 21 made of
(Continued)

a porous material, in which the sound-absorbing membrane 10 is laminated on a surface of the sound absorbing base sheet 21, and then formed into a predetermined shape.

16 Claims, 3 Drawing Sheets

(58) Field of Classification Search
USPC .......................................................... 428/220
See application file for complete search history.

(56) References Cited

FOREIGN PATENT DOCUMENTS

| | | |
|---|---|---|
| JP | H11-219187 | 8/1999 |
| JP | 2000-319615 | 11/2000 |
| JP | 2003-301384 | 10/2003 |
| JP | 2008-087430 | 4/2008 |
| JP | 2009-214871 | 9/2009 |
| JP | 2013-164541 A | 8/2013 |
| JP | 2016-028893 | 3/2016 |
| JP | 2016-155370 A | 9/2016 |
| JP | 2016-221711 | 12/2016 |
| WO | WO 2006/073097 A1 | 7/2006 |

\* cited by examiner

SOUND-ABSORBING OUTER COVERING MATERIAL AND SOUND-ABSORBING MATERIAL

CROSS-REFERENCE TO RELATED APPLICATIONS

This application is a Section 371 national stage of PCT International Application No. PCT/JP2018/017573, filed May 2, 2018, claiming priority to JP 2017-096755 filed on May 15, 2017, the contents of each of which are hereby incorporated by reference into the application.

TECHNICAL FIELD

The present invention relates to a sound-absorbing membrane and a sound-absorbing material using the sound-absorbing membrane that are to be used for interior and exterior materials for, for example, vehicles such as automobiles, buildings such as residential buildings, aircrafts, marine vessels, and the like.

BACKGROUND ART

Porous materials such as, for example, glass wool, rock wool, and felt have been conventionally used in vehicles such as automobiles, buildings such as residential buildings, aircrafts, marine vessels, and the like as sound-absorbing materials, but with a recent increase in eco cars such as electric cars and hybrid cars, there is a growing demand for improving the sound absorbing performance of the sound-absorbing materials. The sound absorbing performance can be ordinarily improved by increasing the thickness or weight of the porous material, but the eco cars are also required to be lighter for fuel efficiency, so that the thickness or weight of the porous material cannot be increased easily. Therefore, in the sound-absorbing materials disclosed in Patent Literatures 1 and 2, a binder resin containing powders is applied to a surface of a porous material to provide a powder layer made of the powders on the surface of the porous material, so that by utilizing vibration of the powders during sound incidence, sound absorbing performance is improved without increasing the thickness or weight of the porous material.

Also, the porous materials, if used as they are, have problems such as brittle surface, poor durability, poor appearance, and the like, and hence they are used in most cases with a fiber sheet or the like laminated on their surfaces, and sound-absorbing materials, aimed at improving sound absorbing performance by providing a sound absorbing property to what is laminated on the surfaces of such porous materials, are proposed. For example, in the sound-absorbing material disclosed in Patent Literature 3, an improvement in sound absorbing performance and weight reduction are achieved by laminating stretchable paper made of pulp fiber on the surface of a porous material. In the sound-absorbing materials disclosed in Patent Literatures 4 and 5, a perforated film is laminated on a surface of a porous material.

Further, of what are laminated on the surface of the porous material, the outermost layer, i.e., a skin material is required to have a good appearance quality since it catches the eyes of users. When a laminate, in which the skin material is laminated on the surface of the porous material, is formed into a predetermined shape to be used as an interior material or exterior material, a press molding machine, in which heating temperature is set to approximately 200° C., is usually used (see, e.g., Patent Literature 6), but in this case appearance quality may become poor because a synthetic resin, an adhesive, or the like, contained in the porous material, oozes out on the surface of the skin material. To prevent such poor appearance quality, in Patent Literature 7, it is configured that an aqueous synthetic resin liquid should not reach a surface of a skin material by applying a water repellent to the surface of the skin material and by impregnating the skin material with the aqueous synthetic resin liquid from a back surface; and in Patent Literature 8, a hot melt adhesive powder dispersion liquid is sprayed on a back surface of a skin material.

CITATIONS LIST

Patent Literatures

Patent Literature 1: Japanese Unexamined Patent Application Publication No. H11-133980
Patent Literature 2: Japanese Unexamined Patent Application Publication No. H11-219187
Patent Literature 3: Japanese Unexamined Patent Application Publication No. 2009-214871
Patent Literature 4: Japanese Unexamined Patent Application Publication No. 2016-221711
Patent Literature 5: Japanese Unexamined Patent Application Publication No. 2016-028893
Patent Literature 6: Japanese Unexamined Patent Application Publication No. 2008-087430
Patent Literature 7: Japanese Unexamined Patent Application Publication No. 2003-301384
Patent Literature 8: Japanese Unexamined Patent Application Publication No. 2000-319615

SUMMARY OF INVENTION

Technical Problems

However, of the above conventional sound-absorbing materials, for example, the sound-absorbing materials disclosed in Patent Literatures 1 to 3 have a problem that when formed into a predetermined shape by heating and pressure molding using the press molding machine, or the like, the sound-absorbing materials are adhered, fixed, or the like, to a mold face of a mold, thereby releasability becoming poor. That is, a mold temperature during heating and pressure molding is set to approximately 180 to 220° C. near the softening point of a thermoplastic resin, and hence in the case of Patent Literature 1 or 2, the sound-absorbing material is adhered, fixed, or the like, to a mold face of a mold because a softened binder resin acts as an adhesive, thereby making releasability poor. In Patent Literature 3, an adhesive used for sticking the stretchable paper is softened during heating and pressure molding, and it oozes out on the surface of the sound-absorbing material after impregnating the stretchable paper and the porous material, and hence the sound-absorbing material is adhered, fixed, or the like, to the mold face of a mold by the adhesive that has oozed out, thereby making releasability poor. In addition, the synthetic resin, the adhesive, or the like, which has oozed out on the surface of the sound-absorbing material during heating and pressure molding, also causes the problem that appearance quality becomes poor, as described above.

If a perforated film is used as in the sound-absorbing materials disclosed in Patent Literatures 4 and 5, an adhesive cannot penetrate into the film, whereby deterioration of releasability and appearance quality can be suppressed. The skin materials of Patent Literatures 7 and 8 are adopted in consideration of penetration of an adhesive, which can suppress deterioration of releasability and appearance quality. However, when a perforated film is used as in Patent Literatures 4 and 5, there is a problem that it is difficult to improve sound absorbing performance, because it is difficult to match the positions of the holes of the film to those of the holes of the porous material, and the like. For the skin materials in Patent Literatures 7 and 8, there is a problem that an improvement in sound absorbing performance is not particularly taken into consideration.

The present invention has been made by focusing on such problems existing in the prior art. An object of the present invention is to provide a sound-absorbing membrane and a sound-absorbing material that can improve sound absorbing performance and maintain suitable appearance quality while improving releasability by suppressing ooze of a synthetic resin, an adhesive, or the like on a surface during heating and pressure molding.

Solutions to Problems

As means for solving the conventional problems, a sound-absorbing membrane includes a base sheet made of a nonwoven fabric impregnated with a water-soluble polymer, and a resin film made of a thermosetting resin covering one surface of the base sheet, wherein a thickness of the resin film is 0.01 to 0.2 mm, fillers are dispersed in the resin film, and a whole airflow resistance is 0.2 to 5.0 kPa·s/m.

The sound-absorbing membrane can additionally include that the water-soluble polymer is impregnated into the nonwoven fabric at a ratio of 0.5 to 5.0% by mass with respect to a mass per unit area of the nonwoven fabric in terms of solid content.

The sound-absorbing membrane can additionally include that the nonwoven fabric is made of a synthetic fiber and/or a cellulose fiber having a softening point of 220° C. or higher.

The sound-absorbing membrane can additionally include that in the resin film, the thermosetting resin is a phenolic resin.

The sound-absorbing membrane can additionally include that in the resin film, a mixing ratio of the fillers/the thermosetting resin is 55/45 to 70/30 in a solid content ratio.

A sound-absorbing material can include the sound-absorbing membrane and a sound absorbing base sheet made of a porous material, wherein the sound-absorbing membrane is laminated on a surface of the sound absorbing base sheet, and then formed into a predetermined shape.

Advantageous Effects of Invention

[Operation]

The sound-absorbing membrane of the present invention includes a base sheet made of a nonwoven fabric and a resin film made of a thermosetting resin covering one surface of the base sheet. Since the resin film is made of a thermosetting resin and it is cured rather than softened by heating when formed into a predetermined shape by heating and pressure molding, poor releasability, which is caused with a conventional thermoplastic resin softened during heating and pressure molding, is hardly caused. Further, fillers are dispersed in the resin film, and thereby the sound-absorbing membrane of the present invention can improve sound absorbing performance and maintain suitable appearance quality while improving releasability.

With respect to the improvement in sound absorbing performance, gaps are formed among the fillers and the thermosetting resin liquid spreads along surfaces of the fillers by adhering to the surfaces, but the gaps are not filled nor closed with thermosetting resin liquid due to a surface tension of the thermosetting resin liquid, and thus an open state can be maintained. Therefore, the resin film of the sound-absorbing membrane of the present invention has air permeability. And, since the resin film is adjusted to have moderate air permeability by setting its thickness to 0.01 to 0.2 mm, a whole airflow resistance of the sound-absorbing membrane can be within a range of 0.2 to 5.0 kPa·s/m, and suitable sound absorbing performance can be exhibited.

Herein, the airflow resistance (Pa·s/m) of the present invention refers to a value measured by an air permeability tester (product name: KES-F8-AP1, manufactured by Kato Tech Co., Ltd., a steady flow differential pressure measurement method).

With respect to the improvement in releasability and the maintenance of suitable appearance quality, the thermosetting resin is applied to the surface of the base sheet in a liquid state, and the applied thermosetting resin liquid adheres to the surfaces of the fillers and generates surface tension, so that the penetration of thermosetting resin liquid into the base sheet more than needed is suppressed by the surface tension, and hence the thermosetting resin liquid hardly oozes out on the surface of the base sheet, and poor releasability and poor appearance quality are suppressed.

Further, since the nonwoven fabric that forms the base sheet is impregnated with the water-soluble polymer, poor releasability, which is caused with the nonwoven fabric that has been softened and melted during heating and pressure molding fused to a mold, or the like, is suppressed.

In addition, when the sound-absorbing membrane is laminated on the surface of a porous material and formed into a predetermined shape by heating and pressure molding, and if the fillers are not dispersed, the thermosetting resin applied to the surface of the base sheet is pressed into the base sheet by directly being pressured and is further squeezed out of the base sheet, so that releasability and appearance quality are made poor, but in the present invention, excessive pressure, which can be applied to the thermosetting resin, can be suppressed with the fillers receiving pressure, so that it is suppressed that the thermosetting resin is pressed into the base sheet and is squeezed out of the base sheet, and hence suitable appearance quality can be maintained while releasability is improved.

Also, in the base sheet, the water-soluble polymer is impregnated into the nonwoven fabric at a ratio of 0.5 to 5.0% by mass to a mass per unit area of the nonwoven fabric in terms of solid content, and hence poor releasability, which is caused with the nonwoven fabric that has been softened and melted during heating and pressure molding fused to a mold, or the like, can be preferably suppressed, and poor appearance quality, which is caused with the water-soluble polymer oozing out on the surface of the base sheet, can be suppressed.

Also, in the base sheet, with the nonwoven fabric made of a synthetic fiber and/or a cellulose fiber having a softening point of 220° C. or higher, softening and melting of the nonwoven fabric during heating and pressure molding can be preferably suppressed, and poor releasability, which is caused with the nonwoven fabric that has been softened and melted fused to a mold, or the like, can be preferably suppressed.

Also, when the thermosetting resin is a phenolic resin in the resin film, a pot life (a period during which processing operations can be performed, a working life) can be extended and performance can be made stable, and the sound-absorbing membrane can be made easy to handle.

Also, by setting a mixing ratio of the fillers/the thermosetting resin to 55/45 to 70/30 in a solid content ratio in the resin film, releasability and sound absorbing performance can be preferably improved, and poor appearance quality, which is caused with the thermosetting resin oozing out on the surface of the base sheet, can be suppressed.

The sound-absorbing membrane of the present invention is laminated on the surface of a sound absorbing base sheet made of a porous material and then formed into a predetermined shape, and thus the sound-absorbing material of the present invention is produced. By using the sound-absorbing membrane, the sound-absorbing material of the present invention can achieve an improvement in sound absorbing performance and an improvement in releasability.

[Effects]

With the sound-absorbing membrane of the present invention and the sound-absorbing material obtained by using the sound-absorbing membrane, sound absorbing performance can be improved, and suitable appearance quality can be maintained while releasability is improved.

DESCRIPTION OF EMBODIMENTS

Hereinafter, an embodiment embodying the present invention will be described with reference to the drawings.

Figure 1:
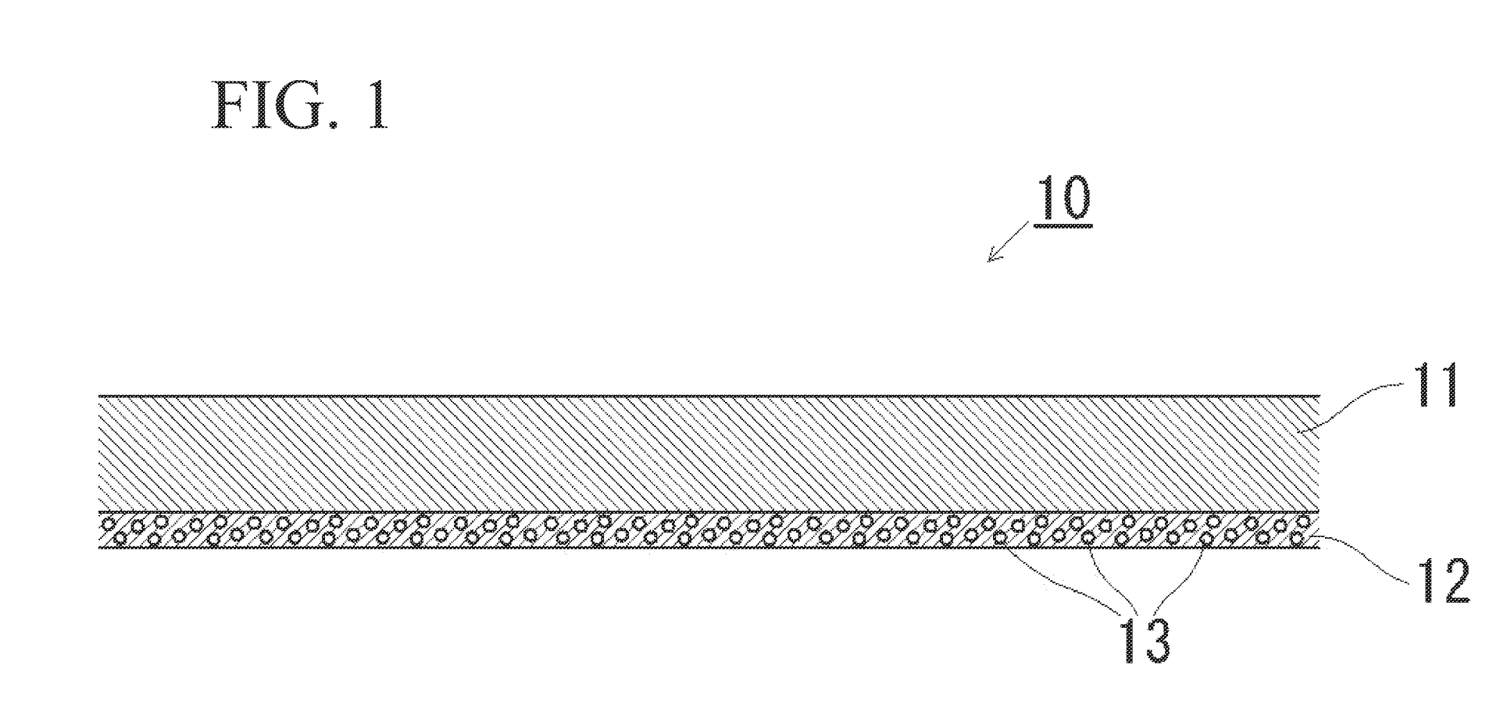
FIG. 1 is a cross-sectional view showing a sound-absorbing membrane of an embodiment.

As shown in FIG. 1, a sound-absorbing membrane 10 of the present embodiment includes a base sheet 11 made of a nonwoven fabric and a resin film 12 covering a back surface that is one surface of the base sheet 11. In the resin film 12, fillers 13 are dispersed.

Depending on a fiber used in the nonwoven fabric, the base sheet 11 is softened, melted, and fused to a mold during heating and pressure molding, and releasability may become poor due to the fusion. Therefore, from the viewpoint of suppressing the softening and melting during heating and pressure molding to improve releasability, it is preferable that a nonwoven fabric to be used in the base sheet 11 be made of a synthetic fiber and/or a cellulose fiber having a softening point of 220° C. or higher. Examples of the synthetic fiber having a softening point of 220° C. or higher include a polyester fiber, polyamide fiber, and aramid fiber that are relatively cheap and easy to obtain, and besides, a polyphenylene sulfide fiber, polyimide fiber, and the like. A cellulose fiber is useful because it is not softened or melted under a high-temperature environment, like a synthetic fiber, and examples thereof include cotton, hemp, pulp, cotton, palm, bamboo, kenaf, rayon that is a recycled fiber, and the like. For the nonwoven fabric of the base sheet 11, one, or two or more of the above fibers are used.

From the viewpoint of providing flame retardancy and the like, an inorganic fiber such as a glass fiber, carbon fiber, ceramic fiber, and asbestos fiber may be contained in the nonwoven fabric of the base sheet 11, from the viewpoint of providing biodegradability and the like, a biodegradable fiber (polylactic acid fiber) made of starch extracted from a plant such as corn or sugar cane may be contained, and from the viewpoint of improving the bonding between fibers and the like, a low melting point fiber having a melting point of 180° C. or lower may be contained in an amount at which releasability is not made poor.

For the nonwoven fabric, a fabric, produced by a spun bond method in which a thermoplastic resin as a material of the fibers is formed into a sheet shape while being discharged in a long fibrous form, a method in which a sheet or mat of a web of the fibers is needle-punched to entangle the fibers, a thermal bond method in which the sheet or mat of the web of the fibers is heated to soften the low melting point thermoplastic fibers to bond the fibers together, a chemical bond method in which the sheet or mat of the web of the fibers is impregnated or mixed with a synthetic resin binder so as to bond the fibers together, a stitch bond method in which the sheet or mat of the web of the fibers is needle-punched to entangle the fibers and the low melting point thermoplastic fibers are heated and softened to bond the fibers together or are sewed with string, a spun lace method in which the fibers are twined together using a high-pressure water stream, or the like, is used.

From the viewpoint of making the sound absorbing performance of the sound-absorbing membrane 10 suitable, it is preferable to set the airflow resistance of the nonwoven fabric to be used in the base sheet 11 to 0.01 to 0.1 kPa·s/m. If the airflow resistance of the nonwoven fabric is excessively low, the nonwoven fabric hardly buffers a sound wave, and hence it becomes difficult for the sound-absorbing membrane 10 to exert sound absorbing performance. If the airflow resistance of the nonwoven fabric is excessively high, it becomes difficult to provide a desired sound absorption characteristic to the sound-absorbing membrane 10.

From the viewpoint of setting the airflow resistance to 0.01 to 0.1 kPa·s/m, it is preferable that the mass per unit area of the nonwoven fabric be set to 10 g/m$^2$ to 120 g/m$^2$ and the thickness of the nonwoven fabric be set to 0.1 to 2.0 mm. If the mass per unit area of the nonwoven fabric is excessively small or the thickness of the nonwoven fabric is excessively thin, there is a high probability that the airflow resistance may not reach 0.01 kPa·s/m. If the mass per unit area of the nonwoven fabric is excessively large or the thickness of the nonwoven fabric is excessively large, there is a high probability that the airflow resistance may exceed 0.1 kPa·s/m.

The nonwoven fabric is impregnated with a water-soluble polymer. The water-soluble polymer has a hydrophilicity, and can suppress fusing of the nonwoven fabric, softened and melted during heating and pressure molding, to a mold, or the like, by acting as a mold lubricant, a surfactant, or the like, and hence releasability can be improved by impregnating the nonwoven fabric with the water-soluble polymer. Examples of the water-soluble polymer include, for example, semi-synthetic polymers such as methylcellulose, carboxymethylcellulose, and hydroxymethylcellulose, and synthetic polymers such as carboxyvinyl polymer, polyacrylic acid, polyvinyl alcohol, and polyvinyl pyrrolidone.

One or more types of the water-soluble polymer are mixed and dissolved in water to reach a predetermined concentration, thereby forming an aqueous solution, and the nonwoven fabric is impregnated with the solution to achieve a predetermined ratio with respect to the mass per unit area of the nonwoven fabric in terms of solid content. The impregnation ratio of the water-soluble polymer is preferably 0.5 to 5.0% by mass with respect to the mass per unit area of the nonwoven fabric in terms of solid content. If the impregnation ratio of the water-soluble polymer is excessively low, it becomes difficult to improve releasability. If the impregnation ratio of the water-soluble polymer is excessively high, the water-soluble polymer, with which the nonwoven fabric has been impregnated, oozes out on the surface of the base sheet 11, and hence there is a fear that the appearance quality of the sound-absorbing membrane 10 may become poor with the base sheet 11 contaminated by the water-soluble polymer.

To the water-soluble polymer, higher fatty acids such as stearic acid and palmitic acid; higher alcohols such as palmityl alcohol and stearyl alcohol; fatty acid esters such as butyl stearate and glycerin monostearate; fatty acid amides; natural waxes and synthetic waxes such as carnauba wax, paraffins, and paraffin oil; and various agents including water repellents and oil repellents such as a fluorine resin, a silicone resin, polyvinyl alcohol, and grease, a pigment, a dye, an antioxidant, an antistatic agent, a crystallization accelerator, flame retardants such as a phosphorus-based compound, a nitrogen-based compound, a sulfur-based compound, a boron-based compound, a bromine-based compound, a guanidine-based compound, a phosphate-based compound, a phosphate ester-based compound, and an amino-based resin, expanded graphite, a flameproofing agent, an insect repellent, an antiseptic agent, a surfactant, a lubricant, an anti-aging agent, an ultraviolet absorber, and the like may be added.

As the material of the resin film 12, a thermosetting resin is used. As the thermosetting resin, for example, a urethane-based resin, a melamine-based resin, and a thermosetting acrylic resin, especially a thermosetting acrylic resin that is cured by forming an ester bond during heating, a urea-based resin, a phenolic resin, an epoxy-based resin, and a thermosetting polyester resin, or the like, is used. Alternatively, a synthetic resin precursor of a prepolymer, an oligomer, a monomer, or the like, such as an urethane-based resin prepolymer, a urea-based resin prepolymer (initial condensate), a phenolic resin prepolymer (initial condensate), a diallyl phthalate prepolymer, an acrylic oligomer, polyvalent isocyanate, a methacrylic ester monomer, or a diallyl phthalate monomer, may be used. From the viewpoint of easy handling, the thermosetting resin is preferably used in a form of an aqueous solution, aqueous emulsion, or aqueous dispersion, but the thermosetting resin may be used in a form of an organic solvent solution. Two or more types of the thermosetting resins or the synthetic resin precursors may be mixed and used.

One of the desirable thermosetting resins is a phenolic resin. There are two types of the phenolic resin, including a resol type phenolic resin that is obtained by the reaction between a phenolic compound and an excess amount of formaldehyde with the use of an alkali catalyst, and a novolak type phenolic resin that is obtained by the reaction between a formaldehyde and an excess amount of phenol with the use of an acid catalyst. The resol type phenolic resin includes various phenol alcohol mixtures to which phenol and formaldehyde are added, and is normally provided as an aqueous solution. The novolak type phenolic resin includes various dihydroxydiphenylmethane derivatives in which phenol is further condensed in the phenol alcohol, and is normally provided in powder.

The desirable phenolic resin is a phenol-alkylresorcin co-condensate. The phenol-alkylresorcin co-condensate provides an aqueous solution of the co-condensate (an initial condensate) having good stability, and is advantageous in that it can be stored for a longer period at room temperature, as compared to a condensate (an initial condensate) consisting of only phenol, so that its pot life can be extended. The resin film 12, obtained by applying the aqueous solution to the base sheet 11 and by bringing the aqueous solution into a semi-cured state, has good stability and does not lose formability even when the sound-absorbing membrane 10 is stored for a long period. Further, alkylresorcin has high reactivity with formaldehydes, catches free aldehyde to react therewith, and thus it also has advantages such as less amount of free aldehyde in the resin.

A polyphenol mixture obtained by the dry distillation of oil shale produced in Estonia is inexpensive, and contains large amounts of 5-methyl resorcin and various types of alkylresorcin that are highly reactive, and hence the polyphenol mixture is a particularly preferred polyphenol raw material in the present invention.

With the phenolic resin, a catalyst or a pH adjuster may be mixed as necessary in its production. Furthermore, a curing agent such as formaldehydes or an alkylolated triazone derivative may be added to the initial condensate (including the initial co-condensate) of the phenolic resin of the present invention. Furthermore, when a water-soluble phenolic resin is used, the phenolic resin may be sulfomethylated and/or sulfimethylated in order to improve the stability of the water-soluble phenolic resin. The details on the above sulfomethylated and/or sulfimethylated resin are described, for example, in Japanese Patent Publication Nos. 3393927 and 3393959.

One of the other desirable thermosetting resins is an ester bond-forming curable thermosetting acrylic resin. The ester bond-forming curable thermosetting acrylic resin is also referred to as a pseudo-thermoplastic resin, and contains (A) a polymer in which 5 to 100% by mass of the polymer contains an ethylenically unsaturated acid anhydride or an ethylenically unsaturated dicarboxylic acid where a carboxylic acid group can form an acid anhydride group, the polymer being obtained by radical polymerization, (B) alkanolamine having at least two hydroxyl groups, and a phosphorus-containing reaction promoter of less than 1.5% by mass based on the sum of (A)+(B), in which the ester bond-forming curable thermosetting acrylic resin is a formaldehyde-free aqueous binder.

The aqueous binder is generally provided in a faun of an aqueous emulsion, an aqueous solution, a water-soluble organic solvent solution such as isopropanol, ethanol, or glycol, a solution of a mixed solvent of water and the water-soluble organic solvent, or the like, and the aqueous binder is cured by an esterification reaction between an acid contained in the polymer (A) and a hydroxyl group contained in the alkanolamine (B), whereby the water solubility is changed to water insolubility and the thermoplasticity is changed to pseudo-thermoplasticity.

The pseudo-thermoplastic resin is currently marketed under the trade name Acrodur by BASF Corp., and examples of aqueous solution types thereof include 950L and DS3530, and examples of aqueous emulsion types thereof include 958D.

The crosslinking of the Acrodur is initiated by the esterification reaction at a temperature of approximately 120° C. or higher, and the Acrodur is cured at a temperature of 160° C. or higher; however, the Acrodur has sufficient hardness even in a thermoplastic state before the crosslinking, and is easily handled; and moreover, the hardness is lowered by heating during thermoforming, so that the Acrodur temporarily becomes thermoplastic (pseudo-thermoplasticity), whereby the Acrodur exhibits good formability and provides high forming accuracy. The crosslinking of the Acrodur is based on the esterification reaction, and hence the Acrodur has advantages that only water is formed as a by-product and a harmful substance such as formaldehyde is not formed as a by-product.

Two or more types of the pseudo-thermoplastic resins, for example, aqueous solution type and aqueous emulsion type pseudo-thermoplastic resins, may be mixed, or the other thermoplastic resin aqueous emulsion and the like may be mixed.

The pseudo-thermoplastic resin is described in detail in, for example, Japanese Translation of PCT International Patent Application Publication No. 2000-506940.

For the purposes of improving the dispersibility of the fillers 13, making it easier to handle the thermosetting resin of the resin film 12, and improving the formability of the thermosetting resin, a general thickener, dispersant, softening agent, plasticizer, or a certain amount of one or two or more types of thermoplastic resins, at which the thermosetting resin is not inhibited, may be mixed with the thermosetting resin. From the viewpoint of easy handling, it is preferable to use the thermoplastic resin in the form of an aqueous solution, aqueous emulsion, or aqueous dispersion, but it may be used in the form of an organic solvent solution.

Examples of the thermoplastic resin include, for example, an acrylate resin, a methacrylate resin, an ionomer resin, an ethylene-ethyl acrylate (EEA) resin, an acrylonitrile-styrene-acryl rubber copolymer (ASA) resin, an acrylonitrile-styrene copolymer (AS) resin, an acrylonitrile-chlorinated polyethylene-styrene copolymer (ACS) resin, an ethylene-vinyl acetate copolymer (EVA) resin, an ethylene vinyl alcohol copolymer (EVOH) resin, a methacrylic resin (PMMA), polybutadiene (BDR), polystyrene (PS), polyethylene (PE), an acrylonitrile-butadiene-styrene-copolymer (ABS) resin, chlorinated polyethylene (CPE), polyvinyl alcohol (PVA), polyvinyl chloride (PVC), polyvinylidene chloride (PVDC), polypropylene (PP), a cellulose acetate (CA) resin, syndiotactic polystyrene (SPS), polyoxymethylene (=polyacetal) (POM), polyamide (PA), polyimide (PI), polyamideimide (PAI), polyetherimide (PEI), polyarylate (PAR), a thermoplastic polyurethane (TPU) elastomer, a thermoplastic elastomer (TPE), a liquid crystal polymer (LCP), polyetheretherketone (PEEK), polysulfone (PSF), polyethersulfone (PES), a fluorine resin, polytetrafluoroethylene (PTFE), polyethylene terephthalate (PET), polycarbonate (PC), polyphenylene ether (PPE), modified PPE, polyphenylene sulfide (PPS), polybutylene terephthalate (PBT), polybenzimidazole (PBI), wholly aromatic polyester (POB), and the like.

The fillers 13 are dispersed in the resin film 12 from the viewpoint of improving the sound absorbing performance of the sound-absorbing membrane 10, improving releasability at the time of heating and pressure molding, and suppressing poor appearance quality.

Examples of the fillers 13 include hollow particles such as shirasu balloon, pearlite, glass balloon, foaming glass, and hollow ceramics; plastic foaming bodies or particles such as foaming polyethylene, foaming polystyrene and foaming polypropylene; inorganic fillers such as calcium carbonate, magnesium carbonate, barium sulfate, calcium sulfate, calcium sulfite, calcium phosphate, calcium hydroxide, magnesium hydroxide, aluminum hydroxide, magnesium oxide, titanium oxide, iron oxide, zinc oxide, alumina, silica, colloidal silica, mica, diatomaceous earth, dolomite, plaster, talc, clay, asbestos, mica, calcium silicate, bentonite, white carbon, carbon black, iron powder, aluminum powder, glass powder, stone powder, blast furnace slag, fly ash, cement, and zirconia powder; and organic fillers such as wood flour, walnut flour, coconut husk flour, wheat flour, and rice flour.

Among the above, the hollow particles such as shirasu balloon are hollow and largely contribute to an improvement in sound absorbing performance, which are desirable as the fillers 13.

In the sound-absorbing membrane 10, the base sheet 11 provides a sound absorbing property to the sound-absorbing membrane 10, and improves the appearance quality of the sound-absorbing membrane 10 by the fiber texture of the nonwoven fabric. In the sound-absorbing membrane 10, the resin film 12 has suitable air permeability because the fillers 13 dispersed and contained in the resin film 12 form gaps among the fillers 13, and the resin film 12 improves the sound absorbing performance of the sound-absorbing membrane 10 by providing a desired sound absorption characteristic to the sound-absorbing membrane 10. And, the sound-absorbing membrane 10 is configured to absorb noise by exhibiting a buffering sound absorbing function when the noise passes through the base sheet 11 and the resin film 12.

The sound-absorbing membrane 10 may be used alone, but mainly the sound-absorbing membrane 10 is laminated on the surface of a porous material and formed into a predetermined shape along with the porous material, whereby the sound-absorbing membrane 10 is used as a sound-absorbing material. Therefore, it is preferable that the sound-absorbing membrane 10 have formability, and in order to provide formability to the sound-absorbing membrane 10, it is preferable that the resin film 12 be formed with a thermosetting resin in a semi-cured state.

Herein, the semi-cured state means a state where the reaction of the thermosetting resin is in an intermediate stage in which the thermosetting resin is soluble in a certain type of solvent and can be softened by heating, but is not completely dissolved or melted, namely, a B-stage (defined in JIS K 6900-1994 and JIS K 6800-2006). A cured state means a state where the reaction of the thermosetting resin is in a final stage, and the thermosetting resin is practically insoluble and infusible, namely, a C-stage (defined in JIS K 6900-1994 and JIS K 6800-2006). Further, an uncured state means a state where the reaction of the thermosetting resin is in an initial stage, and the thermosetting resin is soluble in a certain type of solvent, and melted by heating, namely, an A-stage (defined in JIS K 6900-1994 and JIS K 6800-2006).

The resin film 12 made of the thermosetting resin in the semi-cured state (the B-stage) does not inhibit the flexibility of the base sheet 11 made of a nonwoven fabric, and hence the sound-absorbing membrane 10 has flexible formability. In addition, by bringing the thermosetting resin into the semi-cured state, the resin film 12 has adhesiveness provided by viscosity, and also has functions as an adhesive to the porous material. Further, the resin film 12 has viscosity provided by bringing the thermosetting resin into the semi-cured state, whereby the thermosetting resin is less likely to penetrate into the nonwoven fabric of the base sheet 11, and the thermosetting resin that has penetrated is less likely to ooze out on the surface of the base sheet 11.

That is, by being made of a thermosetting resin in the semi-cured state, the resin film 12 provides formability and adhesiveness to the sound-absorbing membrane 10 and it is suppressed that the thermosetting resin penetrates into and oozes out of the nonwoven fabric of the base sheet 11, and hence the releasability of the sound-absorbing membrane 10 can be improved. Further, by being made of a thermosetting resin in the semi-cured state, it is suppressed that the resin film 12 penetrates into and oozes out of the nonwoven fabric of the base sheet 11, and hence the base sheet 11 can hold a texture like fiber texture, not having a cheap texture like plastic, whereby the sound-absorbing membrane 10 can be provided with good appearance quality.

From the viewpoint of providing suitable sound absorbing performance, in the sound-absorbing membrane 10, the whole airflow resistance of the base sheet 11 and the resin film 12 is set to 0.2 to 5.0 kPa·s/m. If the airflow resistance of the sound-absorbing membrane 10 is not within the range, desired sound absorbing performance cannot be exhibited.

From the viewpoint of setting the whole airflow resistance of the sound-absorbing membrane 10 to 0.2 to 5.0 kPa·s/m in order to provide suitable sound absorbing performance while reducing the weight of the sound-absorbing membrane 10, the mass per unit area of the resin film 12 is preferably 10 $g/m^2$ to 50 $g/m^2$. The mass per unit area of the resin film 12 can be adjusted according to the applied amount (in terms of solid content) of a coating liquid that will be described later.

From the viewpoint of improving sound absorbing performance by setting the whole airflow resistance of the sound-absorbing membrane 10 to 0.2 to 5.0 kPa·s/m, the thickness of the resin film 12 is set to 0.01 to 0.2 mm. If the resin film 12 is excessively thin, a failure is caused, in which the whole airflow resistance of the sound-absorbing membrane 10 becomes excessively low, the resin film 12 breaks during heating and pressure molding, or the like. If the resin film 12 is excessively thick, a failure is caused, in which the whole airflow resistance of the sound-absorbing membrane 10 becomes excessively high and it becomes difficult to improve sound absorbing performance, releasability becomes poor because the thermosetting resin is pressed into and squeezed out of the nonwoven fabric of the base sheet 11 during heating and pressure molding, or the like.

From the viewpoint of setting the whole airflow resistance of the sound-absorbing membrane 10 to 0.2 to 5.0 kPa·s/m, powder having an average particle diameter of 1 to 100 μm is used as the fillers 13. If the average particle diameter of the fillers 13 is excessively small, a gap is less likely to be formed between the fillers 13, whereby the airflow resistance of the sound-absorbing membrane 10 becomes large, and on the other hand, if the average particle diameter of the fillers 13 is excessively large, an excessively large gap is formed between the fillers 13, whereby the airflow resistance of the sound-absorbing membrane 10 becomes small.

From the viewpoint of improving the sound absorbing performance and releasability of the sound-absorbing membrane 10, the mixing ratio of the fillers/the thermosetting resin in the resin film 12 is preferably set to 55/45 to 70/30 in a solid content ratio. In the mixing ratio, if the ratio of the fillers 13 is too high as compared to the thermosetting resin, it is necessary to increase the thickness of the resin film 12 so as to exceed the range, in order to make the whole airflow resistance of the sound-absorbing membrane 10 fall within the range, and hence there is a fear that releasability may become poor as the thickness of the resin film 12 is increased. In the mixing ratio, if the ratio of the thermosetting resin is too high as compared to the fillers 13, it is impossible to make the whole airflow resistance of the sound-absorbing membrane 10 fall within the range even if the thickness of the resin film 12 is reduced to exceed the range, and hence there is a fear that sound absorbing performance may become poor.

Figure 2:
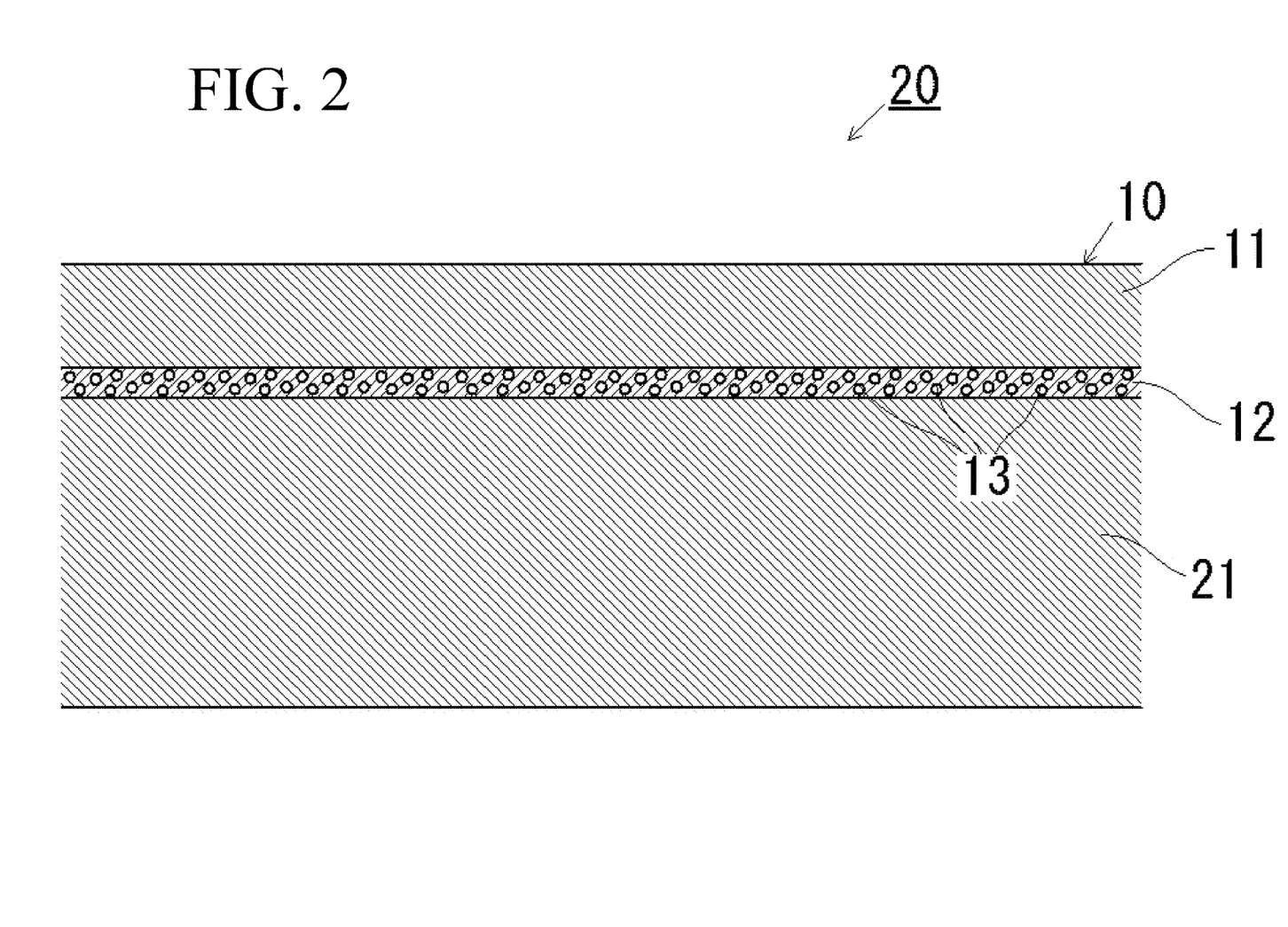
FIG. 2 is a cross-sectional view showing a sound-absorbing material of an embodiment.

As shown in FIG. 2, a sound-absorbing material 20 of the present embodiment is configured by laminating the sound-absorbing membrane 10 on a surface of a sound absorbing base sheet 21 such that the resin film 12 faces the sound absorbing base sheet 21, and by forming the laminate into a predetermined shape. In the sound-absorbing material 20, the releasability from a mold is excellent due to the water-soluble polymer, with which the base sheet 11 has been impregnated, with the base sheet 11 of the sound-absorbing membrane 10 being an outer surface, and appearance quality can be made good with the fiber texture of the nonwoven fabric produced.

Figure 3:
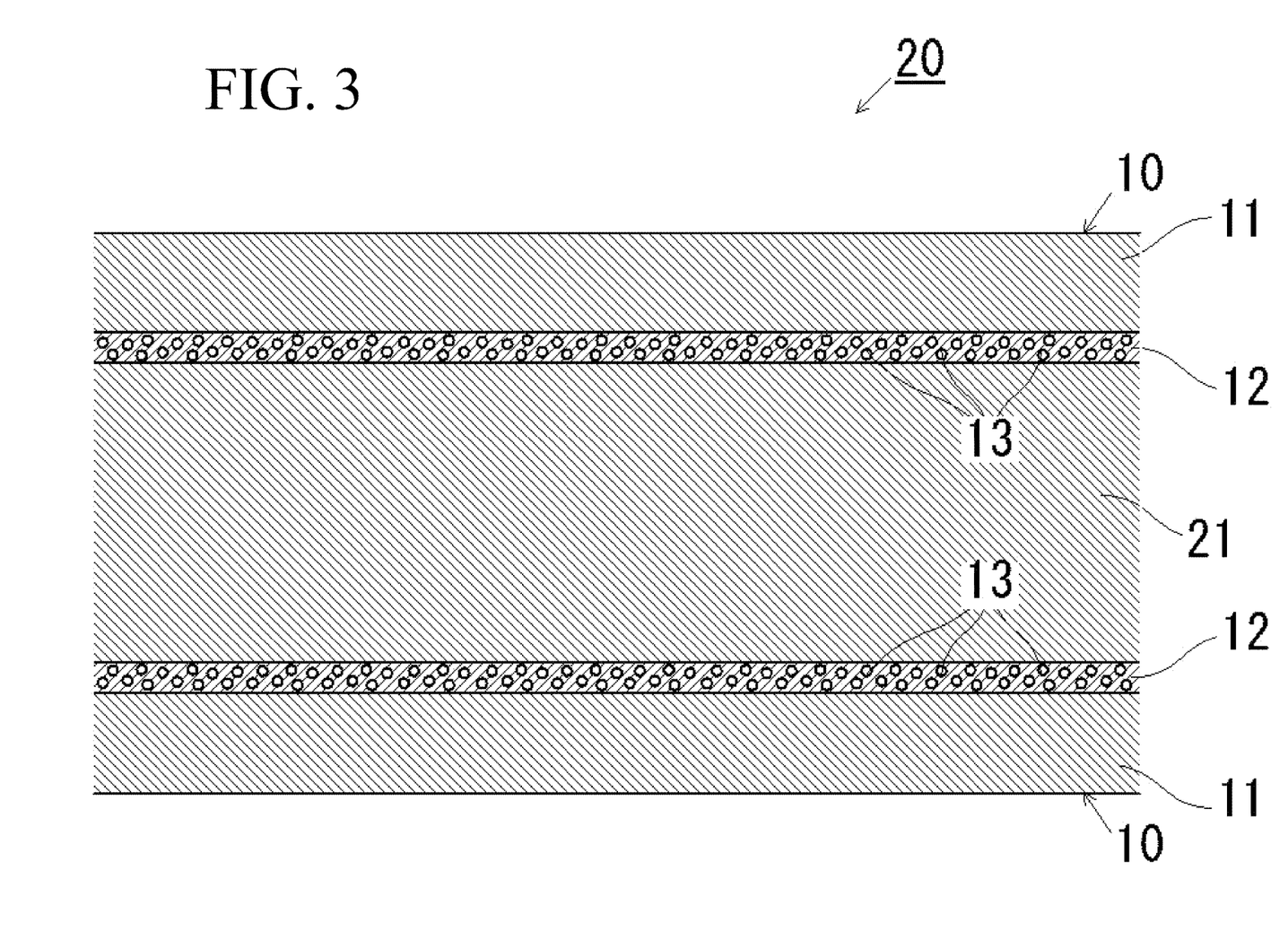
FIG. 3 is a cross-sectional view showing a sound-absorbing material of an embodiment.

Alternatively, the sound-absorbing material 20 may be configured by laminating the sound-absorbing membrane 10 on both front and back surfaces of the sound absorbing base sheet 21, as shown in FIG. 3, without being limited to the configuration in which the sound-absorbing membrane 10 is laminated only on one surface of the sound absorbing base sheet 21.

It is also possible to laminate the sound-absorbing membrane 10 on the surface of the sound absorbing base sheet 21 such that the base sheet 11 faces the sound absorbing base sheet 21, i.e., the resin film 12 is an outer surface. However, when a configuration in which the resin film 12 is an outer surface is adopted, the resin film 12 directly contacts the molding face of a mold, and hence the resin film 12 is more likely to be fused to the mold. Therefore, from the viewpoint of providing suitable releasability, it is preferable to laminate the sound-absorbing membrane 10 on the surface of the sound absorbing base sheet 21 such that the base sheet 11 is an outer surface.

A porous material is used for the sound absorbing base sheet 21. Examples of the porous material include nonwoven fabrics and felts made of the fibers mentioned for the base sheet 11 of the sound-absorbing membrane 10, as well as an inorganic porous materials using glass wool, rock wool, asbestos fibers, carbon fibers, ceramic fibers, metal fibers, whiskers, and the like, or breathable plastic foaming bodies such as breathable polyurethane foaming bodies, breathable polyethylene foaming bodies, breathable polypropylene foaming bodies, breathable polystyrene foaming bodies, breathable phenolic resin foaming bodies, and breathable melamine resin foaming bodies. In principle, the basis weight and thickness of the sound absorbing base sheet 21 can be set optionally.

The sound absorbing base sheet 21 and the sound-absorbing membrane 10 are bonded to each other. For the bonding, the resin film 12 made of the thermosetting resin in the semi-cured state (the B-stage) is used as an adhesive, or an adhesive such as a hot melt adhesive, an acrylic resin adhesive, an acrylic resin pressure-sensitive adhesive, a synthetic rubber adhesive, a synthetic rubber pressure-sensitive adhesive, or the like may be used. When such an adhesive is used, it is essential to maintain the air permeability between the sound absorbing base sheet 21 and the sound-absorbing membrane 10. For example, when the hot melt adhesive is used as the adhesive, from the viewpoint of maintaining the air permeability between the sound absorbing base sheet 21 and the sound-absorbing membrane 10, it is desirable that a powdery adhesive be used and scattered in a dot form at an applied amount of preferably 2 $g/m^2$ to 40 $g/m^2$, and more preferably 5 $g/m^2$ to 30 $g/m^2$.

As the hot melt adhesive, a single substance or a mixture of two or more types of low melting point thermoplastic resin powders such as polyethylene resin powder, polyester resin powder, polyamide resin powder, and ethylene-vinyl acetate copolymer powder, those having a melting point of 80 to 180° C., are used. It is preferable to make the average particle diameter of the hot melt adhesive powder provided by a sieving method fall within the range of 80 to 500 μm. If the average particle diameter is less than 80 μm, and when the hot melt adhesive powder is applied, the powder is scattered, which makes it difficult to uniformly apply the powder, and the density of the formed applied layer of the hot melt resin powder is increased because powders with fine particles gather tightly, so that the applied layer is in a film form as if having no hole, whereby the airflow resistance of the sound-absorbing material 20 tends to be excessive. If the average particle diameter exceeds 500 µm, the obtained applied layer of the hot melt resin powder has a coarse structure, which may decrease adhesion force without the hot-melted adhesives being bonded to each other, and the melted material of the hot melt resin powder oozes out on the surface of the sound-absorbing membrane 10, whereby appearance quality is made poor. Also, powder of large particles spreads by heat melting, and hence there is a fear that a film-shaped membrane with no hole may be formed, whereby air permeability is inhibited and sound absorbing performance is made poor.

The hot melt adhesive may be applied onto the surface of the sound absorbing base sheet 21 or the resin film 12 of the sound-absorbing membrane 10 in a step before the sound-absorbing membrane 10 is bonded to the sound absorbing base sheet 21, or, the hot melt adhesive may be contained in the resin film 12 by previously mixing the hot melt adhesive with a liquid of a thermosetting resin in the uncured state when a coating liquid to be described later is produced.

In producing the sound-absorbing membrane 10, the base sheet 11 made of the nonwoven fabric is impregnated and applied in advance with an impregnation liquid made by dissolving a water-soluble polymer in water, and a coating liquid made by mixing fillers with a thermosetting resin is produced in advance.

The impregnation of the base sheet 11 with the impregnation liquid is performed by adjusting a solid content ratio of the water-soluble polymer to water or a pressure amount on an impregnating roll such that an impregnation amount is at a ratio of 0.5% by mass to 5.0% by mass with respect to the mass per unit area of the nonwoven fabric used in the base sheet 11 in terms of solid content. If the impregnation amount is excessively small, the releasability at the time of heating and pressure molding becomes poor, and if the impregnation amount is excessively large, the fiber texture of the base sheet 11 is inhibited and appearance quality becomes poor.

The coating liquid is produced by dispersing fillers in a liquid of a thermosetting resin in the uncured state (the A-stage) such that the mixing ratio of the fillers/the thermosetting resin is within a range of 55/45 to 70/30 in a solid content ratio.

Next, the coating liquid is applied on one surface of the base sheet 11 impregnated with the impregnation liquid such that the applied amount is within the range of 10 g/m$^2$ to 50 g/m$^2$ in terms of solid content and the thickness after drying is within the range of 0.01 mm to 0.2 mm. The applying method is not particularly limited, and examples thereof include a roll coater, a knife coater, a flow coater, and the like. If the applied amount of the coating liquid is excessively small, the coating liquid does not fully spread over the entire base sheet 11 and the resin film 12 cannot be uniformly formed on one surface of the base sheet 11, and if the applied amount is excessively large, the applied coating liquid penetrates into the interior of the base sheet 11 by its own weight, whereby the coating liquid oozes out on the surface of the sound-absorbing membrane 10 during heating and pressure molding, or the like.

Next, the base sheet 11 to which the coating liquid has been applied is heated and dried at a predetermined temperature to bring the thermosetting resin into the semi-cured state (the B-stage), whereby the resin film 12 is formed. In the heating and drying, the predetermined temperature is appropriately set to a temperature at which the thermosetting resin is in the semi-cured state (the B-stage) according to the thermosetting resin to be used. For example, when the phenolic resin or the ester bond-forming curable thermosetting acrylic resin is used as the thermosetting resin, the temperature is set to 120° C. or higher and 160° C. or lower. If the temperature is lower than 120° C., the thermosetting resin is not in a sufficient semi-cured state (the B-stage), and most of the thermosetting resin is in the uncured state (the A-stage), whereby it cannot be suppressed that the thermosetting resin penetrates into and oozes out of the nonwoven fabric of the base sheet 11. If the temperature is higher than 160° C., the thermosetting resin is in the cured-state (the C-stage), without remaining in the semi-cured state (the B-stage), whereby formability and adhesiveness cannot be provided to the sound-absorbing membrane 10.

That is, the sound-absorbing membrane 10 can be easily produced by applying the coating liquid onto the base sheet 11 made of the nonwoven fabric at a predetermined applied amount, and by heating and drying the coating liquid at a predetermined temperature.

When the sound-absorbing material 20 is produced, a sound absorbing original fabric, formed into a sheet shape and having the sound-absorbing membrane 10 and the sound absorbing base sheet 21, is first produced by laminating the sound-absorbing membrane 10 on the surface of the sound absorbing base sheet 21 made of a porous material.

Next, by performing heating and pressure molding, such as hot press molding, at a temperature of 180° C. or higher on the sound absorbing original fabric, the thermosetting resin of the resin film 12 is brought into the cured state (the C-stage) from the semi-cured state (the B-stage) and the sound absorbing original fabric is formed into a predetermined shape, whereby the sound-absorbing material 20 is produced. During the heating and pressure molding, the water-soluble polymer, with which the base sheet 11 has been impregnated, prevents the sound-absorbing material 20 from being fused to a mold by the action of the water-soluble polymer, whereby the sound-absorbing material 20 can be easily released from the mold. Further, the water-soluble polymer, with which the base sheet 11 has been impregnated and applied, prevents synthetic resins from oozing out on the surface of the sound-absorbing material 20 (the base sheet 11), the synthetic resins including a thermosetting resin in the semi-cured state, an adhesive used for the adhesion between the sound-absorbing membrane 10 and the sound absorbing base sheet 21, an adhesive contained in the sound absorbing base sheet 21 for bonding fibers, and the like. That is, the sound-absorbing material 20, excellent in releasability and having good appearance quality, can be easily produced by laminating the sound-absorbing membrane 10 on the sound absorbing base sheet 21 and by performing heating and pressure molding on the laminate.

EXAMPLES

Hereinafter, the present invention will be described with reference to examples further embodying the present invention, but the present invention is not limited to the examples.
[Sample Production]
(A) Nonwoven fabric: Three types of spun bonded nonwoven fabrics made of polyester fibers (softening point: 238° C.), having masses per unit area of (A-1) to (A-3) below, were used.
(A-1) Mass per unit area: 15 g/m$^2$ (thickness: 0.12 mm, airflow resistance: 0.03 kPa·s/m).

(A-2) Mass per unit area: 50 g/m² (thickness: 0.27 mm, airflow resistance: 0.04 kPa·s/m).

(A-3) Mass per unit area: 100 g/m² (thickness: 0.39 mm, airflow resistance: 0.08 kPa·s/m).

(B) Impregnation liquid: Seven types of aqueous solutions having concentrations of (B-1) to (B-4) and (B-6) to (B-8) below, in solid contents, were used by using polyvinyl alcohol (product name: GL05, manufactured by Nippon Synthetic Chemical Industry Co., Ltd.) as a water-soluble polymer. For (B-5), polyvinyl alcohol was not used, but a nonwoven fabric was used alone.

(B-1) 0.1% by mass polyvinyl alcohol aqueous solution.
(B-2) 0.5% by mass polyvinyl alcohol aqueous solution.
(B-3) 1.0% by mass polyvinyl alcohol aqueous solution.
(B-4) 5.0% by mass polyvinyl alcohol aqueous solution.
(B-5) Polyvinyl alcohol aqueous solution was not used.
(B-6) 1.5% by mass polyvinyl alcohol aqueous solution.
(B-7) 0.4% by mass polyvinyl alcohol aqueous solution.
(B-8) 10.0% by mass polyvinyl alcohol aqueous solution.

(C) Base sheet: After the whole surfaces of the (A) nonwoven fabrics were applied and impregnated with the (B) impregnation liquids by using a roll coater such that the impregnation ratios of the water-soluble polymer with respect to the masses per unit area of the nonwoven fabrics were the values in Table 1 in terms of solid content, the nonwoven fabrics were dried at 120° C. to 150° C. to obtain the base sheets of (C-1) to (C-10) shown in Table 1.

cured state (the B-stage) to form a resin film, thereby obtaining the sound-absorbing membranes of (E-1) to (E-36).

(F) Sound-absorbing material: Of the (E) sound-absorbing membranes, those which have an airflow resistance of 0.2 to 5.0 kPa·s/m were selected and laminated on unmolded glass wool (mass per unit area: 500 g/m², thickness: 20 mm) as a sound absorbing base sheet such that the resin film faced the sound absorbing base sheet, and molded by using a heating press molding machine at 220° C. and for 60 seconds, thereby obtaining sound-absorbing materials. The sound-absorbing materials were formed into a shape having a concave-convex portion in which a peripheral part forming a square frame shape in plan view had a thickness of 3 mm and a center part located on an inner side of the peripheral part had a thickness of 5 to 10 mm.

[Evaluation of Sound Absorbing Performance]

The airflow resistances of the above (E) sound-absorbing membranes were measured, so that the sound-absorbing membranes were evaluated according to the following two categories. The results are shown in Tables 2 and 3.

○: Airflow resistance is within the range of 0.2 to 5.0 kPa·s/m.

x: Airflow resistance is out of the range of 0.2 to 5.0 kPa·s/m.

TABLE 1

| (C) Base sheet | (A) Nonwoven fabric Type | Mass per unit area (g/m²) | (B) Type | Water-soluble polymer Concentration (% by mass) | Impregnation ratio (% by mass) | Impregnation amount per unit area (g/m²) Dry | Wet |
|---|---|---|---|---|---|---|---|
| C-1 | A-1 | 15 | B-1 | 0.1 | 0.5 | 0.075 | 75.0 |
| C-2 | A-1 | 15 | B-3 | 1.0 | 5.0 | 0.75 | 75.0 |
| C-3 | A-2 | 50 | B-2 | 0.5 | 0.5 | 0.25 | 50.0 |
| C-4 | A-2 | 50 | B-4 | 5.0 | 5.0 | 2.5 | 50.0 |
| C-5 | A-3 | 100 | B-3 | 1.0 | 0.5 | 0.5 | 50.0 |
| C-6 | A-3 | 100 | B-4 | 5.0 | 5.0 | 5.0 | 100.0 |
| C-7 | A-1 | 15 | B-5 | — | — | — | — |
| C-8 | A-1 | 15 | B-6 | 1.5 | 6.0 | 0.9 | 60.0 |
| C-9 | A-3 | 100 | B-7 | 0.4 | 0.2 | 0.2 | 50.0 |
| C-10 | A-3 | 100 | B-8 | 10.0 | 6.0 | 6.0 | 60.0 |

(D) Coating liquid: A resol type phenol-alkylresorcin initial co-condensation resin (an aqueous solution having a solid content of 45% by mass) was used as a thermosetting resin liquid, and shirasu balloon (an average particle diameter: 45 μm) as fillers was added thereto such that the mixing ratios in a solid content ratio were set to (D-1) to (D-4) below, and an acrylic thickener was further added thereto to adjust the aqueous solutions to have a viscosity of 100 poise and a solid content of 20% by mass, thereby obtaining coating liquids.

(D-1) Mixing ratio of fillers/thermosetting resin: 55/45.
(D-2) Mixing ratio of fillers/thermosetting resin: 70/30.
(D-3) Mixing ratio of fillers/thermosetting resin: 50/50.
(D-4) Mixing ratio of fillers/thermosetting resin: 75/25.

(E) Sound-absorbing membrane: After the (D) coating liquids were applied to one surfaces of the (C) base sheets by a roll coat method such that the applied amounts were set to the values shown in Tables 2 and 3 in terms of solid content, the coating liquids were heated and dried at 100° C. to 120° C. to bring the thermosetting resins into the semi-

[Evaluation of Releasability]

The releasabilities in molding the (F) sound-absorbing materials were evaluated according to the following four categories. The results are shown in Tables 2 and 3.

⊙: A sound-absorbing material can be easily released without being fused to a mold.

○: A sound-absorbing material is slightly fused to a mold, but it can be released by applying small force without deforming a molding.

Δ: A sound-absorbing material is fused to a mold, which can be released by applying large force, but it is necessary to deform a molding when released.

x: It is difficult to release a sound-absorbing material due to fusion to a mold, and if the sound-absorbing material is forced to be released by applying quite large force, a molding is greatly deformed or damaged.

[Evaluation of Appearance]

The appearances of the (F) sound-absorbing materials were visually evaluated according to the following four categories. The results are shown in Tables 2 and 3.

⊙: A molded shape is good, a surface is excellent in fabric texture, and design is good.

○: A molded shape is good, and fabric texture is good, although fabrics look slightly stiff in part of a surface.

Δ: A molded shape is good, but it is recognized that a synthetic resin (a water-soluble polymer or a thermosetting resin) oozes out on a surface, whereby fabric texture is impaired.

x: A molded shape is broken, and a synthetic resin (a water-soluble polymer or a thermosetting resin) oozes out on a surface, whereby appearance becomes poor.

sound-absorbing materials of F-1 to F-12, there was no problem with the releasabilities and appearances.

From the results of Table 3, for the sound-absorbing membranes of E-13 and E-14 in which the base sheets were not impregnated with a water-soluble polymer, the whole airflow resistances were within the range of 0.2 to 5.0 kPa·s/m, but for the sound-absorbing materials of F-13 and F-14 using the above sound-absorbing membranes, the releasabilities were both evaluated as x and appearances as Δ and x.

TABLE 2

| (E) Sound-absorbing membrane | (C) Base sheet | (D) Coating liquid Type | Applied amount (g/m²) | Thickness of resin film (mm) | Airflow resistance (kPa·s/m) | Evaluation | (F) Sound-absorbing material | Evaluation of sound-absorbing material Releasability | Appearance |
|---|---|---|---|---|---|---|---|---|---|
| E-1 | C-1 | D-1 | 15.5 | 0.02 | 0.22 | ○ | F-1 | ⊙ | ⊙ |
| E-2 | C-1 | D-2 | 15.1 | 0.02 | 0.38 | ○ | F-2 | ○ | ○ |
| E-3 | C-2 | D-1 | 18.3 | 0.02 | 0.30 | ○ | F-3 | ⊙ | ⊙ |
| E-4 | C-2 | D-2 | 18.2 | 0.02 | 0.42 | ○ | F-4 | ⊙ | ⊙ |
| E-5 | C-3 | D-1 | 27.3 | 0.09 | 0.83 | ○ | F-5 | ⊙ | ⊙ |
| E-6 | C-3 | D-2 | 27.5 | 0.10 | 1.55 | ○ | F-6 | ○ | ⊙ |
| E-7 | C-4 | D-1 | 28.1 | 0.09 | 1.31 | ○ | F-7 | ⊙ | ⊙ |
| E-8 | C-4 | D-2 | 27.4 | 0.12 | 2.05 | ○ | F-8 | ⊙ | ⊙ |
| E-9 | C-5 | D-1 | 34.7 | 0.13 | 2.86 | ○ | F-9 | ⊙ | ⊙ |
| E-10 | C-5 | D-2 | 35.1 | 0.16 | 4.08 | ○ | F-10 | ○ | ○ |
| E-11 | C-6 | D-1 | 37.0 | 0.17 | 3.11 | ○ | F-11 | ⊙ | ⊙ |
| E-12 | C-6 | D-2 | 38.0 | 0.18 | 4.26 | ○ | F-12 | ⊙ | ⊙ |

TABLE 3

| (E) Sound-absorbing membrane | (C) Base sheet | (D) Coating liquid Type | Applied amount (g/m²) | Thickness of resin film (mm) | Airflow resistance (kPa·s/m) | Evaluation | (F) Sound-absorbing material | Evaluation of sound-absorbing material Releasability | Appearance |
|---|---|---|---|---|---|---|---|---|---|
| E-13 | C-7 | D-1 | 15.8 | 0.02 | 0.26 | ○ | F-13 | x | Δ |
| E-14 | C-7 | D-2 | 16.0 | 0.02 | 0.37 | ○ | F-14 | x | x |
| E-15 | C-8 | D-1 | 17.0 | 0.02 | 0.31 | ○ | F-15 | ⊙ | Δ |
| E-16 | C-8 | D-2 | 16.9 | 0.02 | 0.40 | ○ | F-16 | ⊙ | Δ |
| E-17 | C-9 | D-1 | 34.4 | 0.14 | 2.50 | ○ | F-17 | Δ | x |
| E-18 | C-9 | D-2 | 34.0 | 0.16 | 3.30 | ○ | F-18 | Δ | x |
| E-19 | C-10 | D-1 | 37.5 | 0.18 | 3.10 | ○ | F-19 | ⊙ | Δ |
| E-20 | C-10 | D-2 | 38.1 | 0.18 | 4.40 | ○ | F-20 | ⊙ | Δ |
| E-21 | C-3 | D-1 | 8.9 | 0.008 | 0.06 | x | — | — | — |
| E-22 | C-3 | D-2 | 8.8 | 0.007 | 0.07 | x | — | — | — |
| E-23 | C-3 | D-1 | 47.8 | 0.31 | 6.88 | x | — | — | — |
| E-24 | C-3 | D-2 | 50.0 | 0.30 | 8.96 | x | — | — | — |
| E-25 | C-4 | D-1 | 8.3 | 0.008 | 0.07 | x | — | — | — |
| E-26 | C-4 | D-2 | 7.9 | 0.007 | 0.10 | x | — | — | — |
| E-27 | C-4 | D-1 | 55.0 | 0.37 | 6.98 | x | — | — | — |
| E-28 | C-4 | D-2 | 55.1 | 0.39 | 9.10 | x | — | — | — |
| E-29 | C-3 | D-3 | 8.9 | 0.008 | 0.07 | x | — | — | — |
| E-30 | C-3 | D-3 | 15.7 | 0.02 | 4.13 | ○ | F-30 | Δ | x |
| E-31 | C-3 | D-4 | 16.0 | 0.02 | 0.11 | x | — | — | — |
| E-32 | C-3 | D-4 | 38.1 | 0.23 | 4.90 | ○ | F-32 | x | x |
| E-33 | C-4 | D-3 | 15.1 | 0.03 | 0.09 | x | — | — | — |
| E-34 | C-4 | D-3 | 34.4 | 0.02 | 4.39 | ○ | F-34 | Δ | x |
| E-35 | C-4 | D-4 | 12.6 | 0.08 | 0.09 | x | — | — | — |
| E-36 | C-4 | D-4 | 37.8 | 0.21 | 4.51 | ○ | F-36 | x | x |

[DISCUSSION]

From the results of Table 2, for the sound-absorbing membranes of E-1 to E-12, the whole airflow resistances were within the range of 0.2 to 5.0 kPa·s/m, and for the For the sound-absorbing membranes of E-15 and E-16 in which the impregnation ratios of a water-soluble polymer exceeded 5.0% by mass, the whole airflow resistances were within the range of 0.2 to 5.0 kPa·s/m, and for the sound-absorbing materials of F-15 and F-16 using the above sound-absorbing membranes, there was no problem with the releasabilities, but the appearances were evaluated as Δ.

For the sound-absorbing membranes of E-17 and E-18 in which the impregnation ratios of a water-soluble polymer were less than 0.5% by mass, the whole airflow resistances were within the range of 0.2 to 5.0 kPa·s/m, but for the sound-absorbing materials of F-17 and F-18 using the above sound-absorbing membranes, the releasabilities were evaluated as Δ, and the appearances as x.

For the sound-absorbing membranes of E-19 and E-20 in which the impregnation ratios of a water-soluble polymer exceeded 5.0% by mass and the applied amounts of a coating liquid were increased, the whole airflow resistances were within the range of 0.2 to 5.0 kPa·s/m, and for sound-absorbing materials of F-19 and F-20 using the above sound-absorbing membranes, there was no problem with the releasabilities, but the appearances were evaluated as Δ.

For the sound-absorbing membranes of E-21 to E-28 in which the thicknesses of the resin films were out of the range of 0.01 to 0.2 mm, the whole airflow resistances were out of the range of 0.2 to 5.0 kPa·s/m.

For the sound-absorbing membrane of E-29 in which the mixing ratio of the fillers/thermosetting resin in the resin film was set to 50/50 such that the ratio of the thermosetting resin was increased from the ratio of 55/45, the airflow resistance was less than 0.2 kPa·s/m when the thickness of the resin film was set to be less than 0.01 mm. For the sound-absorbing membrane of E-30 in which the mixing ratio was set in the same way, the airflow resistance was 4.13 kPa·s/m that was close to the upper limit, when the thickness of the resin film was 0.02 mm, and for the sound-absorbing material of F-30 using the above sound-absorbing membrane, the releasability was evaluated as Δ, and the appearance as x.

For the sound-absorbing membrane of E-31 in which the mixing ratio of the fillers/thermosetting resin in the resin film was set to 75/25 such that the ratio of the fillers was increased from the ratio of 70/30, the airflow resistance was less than 0.2 kPa·s/m when the thickness of the resin film was 0.02 mm. For the sound-absorbing membrane of E-32 in which the mixing ratio was set in the same way, the airflow resistance was 4.9 kPa·s/m that was close to the upper limit, when the thickness of the resin film exceeded 0.2 mm, and for the sound-absorbing material of F-32 using the above sound-absorbing membrane, the releasability was evaluated as x, and the appearance as x.

For the sound-absorbing membrane of E-33 in which the mixing ratio of the fillers/thermosetting resin in the resin film was set to 50/50 such that the ratio of the thermosetting resin was increased from the ratio of 55/45, the airflow resistance was less than 0.2 kPa·s/m when the thickness of the resin film was 0.03 mm. For the sound-absorbing membrane of E-34 in which the mixing ratio was set in the same way, the airflow resistance was 4.39 kPa·s/m that was close to the upper limit, when the thickness of the resin film was 0.02 mm, and for the sound-absorbing material of F-34 using the above sound-absorbing membrane, the releasability was evaluated as Δ, and the appearance as x.

For the sound-absorbing membrane of E-35 in which the mixing ratio of the fillers/thermosetting resin in the resin film was set to 75/25 such that the ratio of the fillers was increased from the ratio of 70/30, the airflow resistance was less than 0.2 kPa·s/m when the thickness of the resin film was 0.08 mm. For the sound-absorbing membrane of E-36 in which the mixing ratio was set in the same way, the airflow resistance was 4.51 kPa·s/m that was close to the upper limit, when the thickness of the resin film exceeded 0.2 mm, and for the sound-absorbing material of F-36 using the above sound-absorbing membrane, the releasability was evaluated as x, and the appearance as x.

From the above, it was shown that when the whole airflow resistance of a sound-absorbing membrane is set to be within the range of 0.2 to 5.0 kPa·s/m such that the releasability and appearance quality of a sound-absorbing material are made suitable (an acceptance criterion is that a sound-absorbing material has an evaluation of Δ or ○ or ⊙), it is necessary to impregnate the nonwoven fabric of a base sheet with a water-soluble polymer and to set the thickness of a resin film to 0.01 to 0.2 mm.

It was also shown that by setting the mixing ratio of the fillers/thermosetting resin to 55/45 to 70/30 in a solid content ratio, the thickness of the resin film can be easily adjusted to 0.01 to 0.2 mm while the airflow resistance is maintained within the range of 0.2 to 5.0 kPa·s/m, the sound absorbing performance and releasability can be made suitable, and the appearance quality of the sound-absorbing material can be made suitable.

It was also shown that when an acceptance criterion is that a sound-absorbing material has an evaluation of ○ or ⊙, the releasability and appearance quality of the sound-absorbing material can be made good by setting the impregnation ratio of a water-soluble polymer to 0.5 to 5.0% by mass with respect to the mass per unit area of the nonwoven fabric in terms of solid content.

[Production Example]

To nonwoven fabrics having a mass per unit area of 25 g/m² that were made of polyester fibers (softening point: 230° C.) and produced by a spun lace method, an impregnation liquid, including 90 parts by mass of a polyvinyl alcohol aqueous solution having a concentration of 1.0% by mass that is a water-soluble polymer, 5 parts by mass of a fluorine-based water repellent aqueous solution having a concentration of 20% by mass, and 5 parts by mass of phosphorus, nitrogen flame retardant having a concentration of 50% by mass, was applied at an applied amount of 80 g/m² such that the nonwoven fabrics were impregnated with the water-soluble polymer at a ratio of 2.88% by mass with respect to the mass per unit area of the nonwoven fabric in terms of solid content, and then the nonwoven fabrics were dried at 150° C. to obtained a base sheet.

Next, a coating liquid (fillers/thermosetting resin=60/40, solid content: 22.5%, viscosity: 10 poise), obtained by mixing 8 parts by mass of shirasu balloon (particle diameter: 20 to 30 µm) and 4 parts by mass of pearlite (particle size: 30 to 40 µm) as the fillers, 16 parts by mass of 50% sulfomethylated phenol-alkyl resorcin-formaldehyde initial co-condensation resin aqueous solution as the thermosetting resin, 1 part by mass of 25% carbon black water dispersion, 4 parts by mass of 27% primal ASE60, 5 parts by mass of 25% ammonia water, and 62 parts by mass of water, was applied to one surface of the base sheet at an applied amount of 31 g/m² in terms of solid content by a roll coat method, and the base sheet was then heated at 110° C. to bring the thermosetting resin into the B-stage, thereby obtaining a sound-absorbing membrane (airflow resistance: 0.87 Kpa·s/m) including a resin film having a thickness of 0.09 mm.

Next, the sound-absorbing membrane was laminated on a surface of uncured glass wool having a mass per unit area of 500 g/m² as a porous base sheet of a sound absorbing base sheet such that the resin film of the sound-absorbing membrane faced toward the sound absorbing base sheet, and the laminate was then formed into a predetermined shape by heat press molding at 200° C. for 1 minute, thereby obtaining a sound-absorbing material. The obtained sound-absorbing material had a good sound-absorbing property, in which releasability from a mold was good, the thermosetting resin did not ooze out on the surface, and fabric texture was excellent.

INDUSTRIAL APPLICABILITY

The sound-absorbing membrane and the sound-absorbing material of the present invention can improve sound absorbing performance and can improve releasability, and hence they are industrially available.

REFERENCE SIGNS LIST

10 Sound-absorbing membrane
11 Base sheet
12 Resin film
13 Fillers
20 Sound-absorbing material
21 Sound absorbing base sheet

The invention claimed is:

1. A sound-absorbing membrane comprising:
a base sheet made of a nonwoven fabric impregnated with a water-soluble polymer; and
a resin film made of a thermosetting resin covering one surface of the base sheet,
wherein
a thickness of the resin film is 0.01 to 0.2 mm,
fillers are dispersed in the resin film, and
a whole airflow resistance of the sound-absorbing membrane is 0.2 to 5.0 kPa·s/m.

2. The sound-absorbing membrane according to claim 1, wherein the water-soluble polymer is impregnated into the nonwoven fabric at a ratio of 0.5 to 5.0% by mass with respect to a mass per unit area of the nonwoven fabric in terms of solid content.

3. The sound-absorbing membrane according to claim 1, wherein the nonwoven fabric is made of a synthetic fiber and/or a cellulose fiber having a softening point of 220° C. or higher.

4. The sound-absorbing membrane according to claim 1, wherein, in the resin film, the thermosetting resin is a phenolic resin.

5. The sound-absorbing membrane according to claim 1, wherein, in the resin film, a mixing ratio of the fillers/the thermosetting resin is 55/45 to 70/30 in a solid content ratio.

6. A sound-absorbing material comprising:
the sound-absorbing membrane according to claim 1; and
a sound absorbing base sheet made of a porous material,
wherein the sound-absorbing membrane is laminated on a surface of the sound absorbing base sheet, and then formed into a predetermined shape.

7. The sound-absorbing membrane according to claim 2, wherein the nonwoven fabric is made of a synthetic fiber and/or a cellulose fiber having a softening point of 220° C. or higher.

8. The sound-absorbing membrane according to claim 2, wherein, in the resin film, the thermosetting resin is a phenolic resin.

9. The sound-absorbing membrane according to claim 3, wherein, in the resin film, the thermosetting resin is a phenolic resin.

10. The sound-absorbing membrane according to claim 2, wherein, in the resin film, a mixing ratio of the fillers/the thermosetting resin is 55/45 to 70/30 in a solid content ratio.

11. The sound-absorbing membrane according to claim 3, wherein, in the resin film, a mixing ratio of the fillers/the theii iosetting resin is 55/45 to 70/30 in a solid content ratio.

12. The sound-absorbing membrane according to claim 4, wherein, in the resin film, a mixing ratio of the fillers/the thermosetting resin is 55/45 to 70/30 in a solid content ratio.

13. A sound-absorbing material comprising:
the sound-absorbing membrane according to claim 2; and
a sound absorbing base sheet made of a porous material,
wherein the sound-absorbing membrane is laminated on a surface of the sound absorbing base sheet, and then fainted into a predeteiinined shape.

14. A sound-absorbing material comprising:
the sound-absorbing membrane according to claim 3; and
a sound absorbing base sheet made of a porous material,
wherein the sound-absorbing membrane is laminated on a surface of the sound absorbing base sheet, and then formed into a predetermined shape.

15. A sound-absorbing material comprising:
the sound-absorbing membrane according to claim 4; and
a sound absorbing base sheet made of a porous material,
wherein the sound-absorbing membrane is laminated on a surface of the sound absorbing base sheet, and then formed into a predetermined shape.

16. A sound-absorbing material comprising:
the sound-absorbing membrane according to claim 5; and
a sound absorbing base sheet made of a porous material,
wherein the sound-absorbing membrane is laminated on a surface of the sound absorbing base sheet, and then fonned into a predetermined shape.

* * * * *